March 13, 1951 D. C. HARVEY ET AL 2,544,879
FILM METERING DOUBLE EXPOSURE PREVENTION CAMERA
Filed Sept. 18, 1947 2 Sheets-Sheet 1
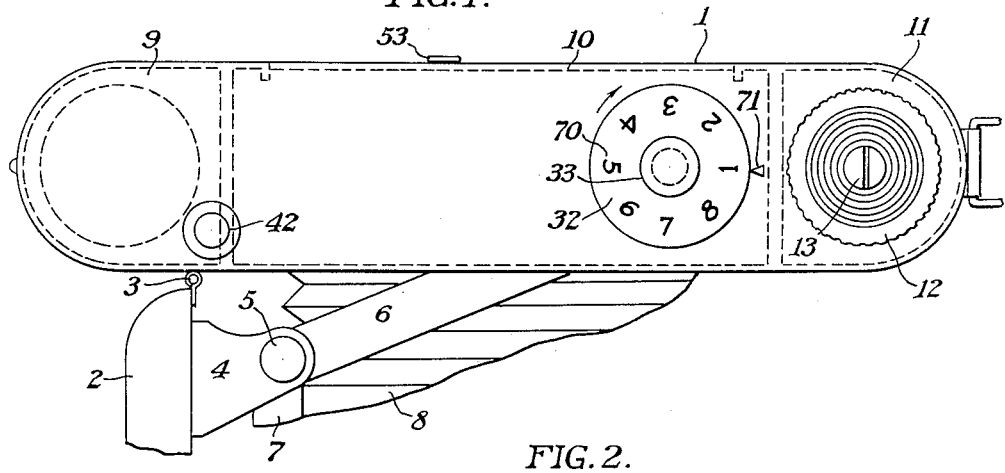
DOUGLASS C. HARVEY
EDGAR S. MARVIN
INVENTORS

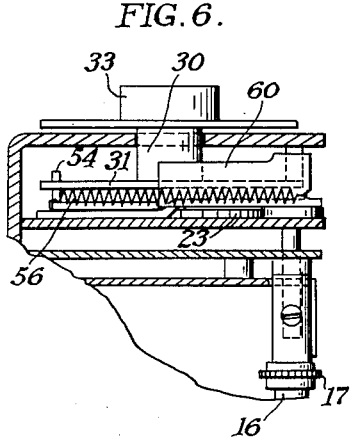
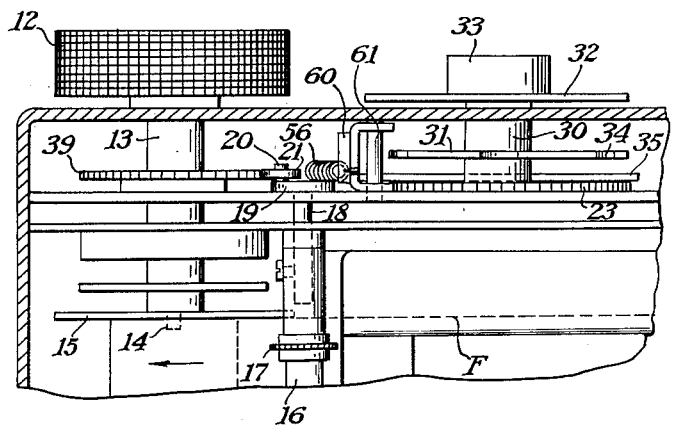
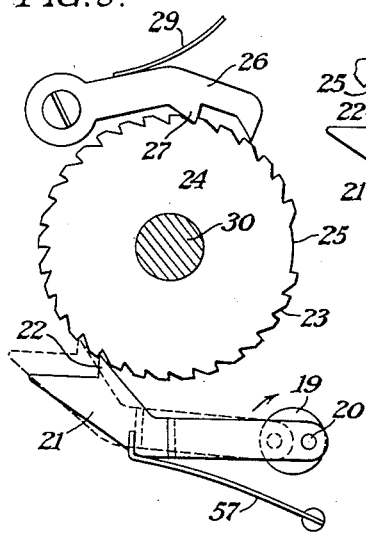
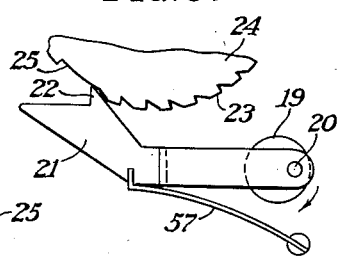
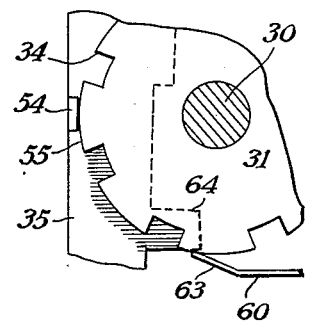
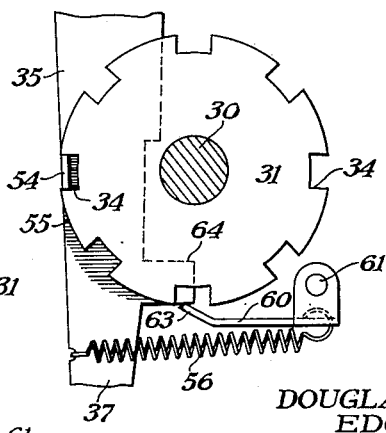
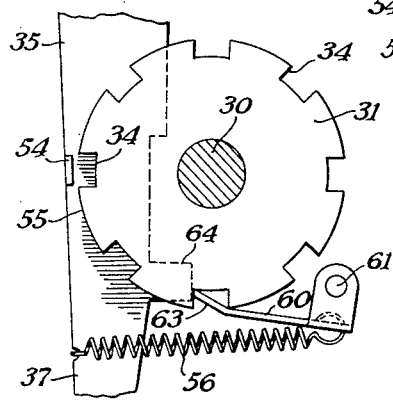
DOUGLASS C. HARVEY
EDGAR S. MARVIN
INVENTORS Patented Mar. 13, 1951

2,544,879

UNITED STATES PATENT OFFICE 2,544,879

FILM METERING DOUBLE EXPOSURE PREVENTION CAMERA

Douglass C. Harvey and Edgar S. Marvin, Rochester, N. Y., assignors to Eastman Kodak Company, Rochester, N. Y., a corporation of New Jersey Application September 18, 1947, Serial No. 774,804

9 Claims. (Cl. 95—31)

This invention relates to photography and more particularly to cameras of the roll-film type. One object of our invention is to provide a simple and efficient film-metering device. Another object of our invention is to provide a film-metering device which both indicates the number of exposures taken and which also controls the operation of the film wind to meter the required amount of film for each exposure. A still further object of our invention is to provide a mechanism for metering film which permits the uninterrupted winding of the tail strip of film-backing paper after all of the films have been exposed. Still another object of our invention is to provide a mechanism of the class described in which a means for preventing double exposures may be included. A still further object of our invention is to provide a drive for mechanism of the type described above which imposes only an extremely light load on the film which drives the mechanism. Other objects will appear from the following specification, the novel features being particularly pointed out in the claims at the end thereof.

Many cameras have been constructed with means for indicating the number of exposures made and with metering devices including double-exposure prevention mechanism, but it is extremely difficult to provide such a mechanism which is entirely reliable. One of the primary reasons for failure of many of such mechanisms is that where the film movement is the prime moved of the mechanism, it frequently happens that too great a load is placed on the film, and the wheel which drives the film can readily be made to tear it. One of the primary objects of our invention is to provide a mechanism which imposes extremely little load on the film, and to provide a mechanism which can be readily made to operate satisfactorily without the usual close tolerances on the parts.

This application is a continuation-in-part of my copending application Serial No. 701,386, filed October 4, 1946, now abandoned.

Coming now to the drawings wherein like reference characters denote like parts throughout:

Fig. 1 is a top plan view of a typical camera which may be constructed in accordance with and embodying one form of our invention;

Fig. 2 is a view similar to Fig. 1 but with the cover plate for some of the mechanism removed, and with the parts in the position they may assume after an exposure has been made;

Fig. 3 is a view similar to Fig. 2 but with the parts in the position they assume after a fresh film has been wound into position for exposure;

Fig. 4 is a fragmentary detail section through the shutter release before an exposure is made;

Fig. 5 is a view similar to Fig. 4 but with the shutter release in a locked condition after an exposure has been made;

Fig. 6 is a fragmentary sectional view through a portion of the camera showing the ratchet drive mechanism;

Fig. 7 is a fragmentary sectional view showing parts of the camera in elevation, and showing the ratchet drive and metering mechanism;

Fig. 8 is a fragmentary detail showing an elevation of the ratchet, pawl for driving the ratchet, and the backlash pawl;

Fig. 9 is a fragmentary view showing the driving pawl in idling position with respect to the ratchet;

Fig. 10 is a plan view of the metering notched disk with the film-wind control lever in an inoperative position to permit film winding;

Fig. 11 is a view similar to Fig. 10 but with the notched disk in a position to latch the film-winding knob against movement; and Fig. 12 is a view similar to Figs. 10 and 11 with the parts in an intermediate position while the film is in the process of being wound.

Our invention comprises broadly providing a film-metering device by which exposure areas of film, passing over the exposure frame, may be accurately controlled to the required amount. This mechanism may be used as a film counter in addition to controlling the amount of film, and it may also be included as a part of a double-exposure prevention device with which it may be readily incorporated.

In the embodiment of our invention illustrated, the camera may include a body portion 1 to which a camera bed 2 may be hinged at 3 to fold to-and-from an open, or picture-taking, position. The bed 2 may include brackets 4, supporting studs 5 which carry bed braces 6, and if the camera is of the self-erecting type it may also include links 7 which extend to the lens board of the camera in a well-known manner, This lens board is, of course, connected to the camera body by a bellows 8. The camera, like most roll-film cameras, may include a film-supply chamber 9, an exposure frame 10, and a take-up film chamber 11; there being a winding knob 12 carried on a shaft 13 passing into this take-up chamber, as best shown in Fig. 7. The shaft 13 may terminate in a web 14 to engage the usual slot in the film spool flange 15 for winding film "F" from the supply chamber 9 to the take-up chamber 11 during exposures. As thus far described, the camera may be of any well-known type.

Our invention includes applying the following mechanism for metering film and for preventing double exposures to any roll-film camera, of which the above described is merely typical. The film "F," being led from the supply chamber 9 to the take-up chamber 11, passes over a guide roll 16, best shown in Fig. 7; this guide roll having one or more toothed wheels 17 for contacting with the film and for being turned by the film. Guide rolls 16, through the toothed wheels 17, turn a shaft 18, which, in the present instance, carries a disk 19 from which a crank pin 20 extends upwardly. As indicated in Figs. 8 and 9, the crank pin 20 is eccentric of the shaft 18 and is for oscillating a pawl 21 having a sharp tooth 22 adapted to engage the teeth 23 of a ratchet wheel 24. This ratchet wheel has teeth extending about the major part of its periphery, but there is an area 25 from which one or more teeth are removed, so that when the ratchet wheel has been turned by the pawl until the mutilated portion 25 is reached, the pawl can continue to oscillate, riding idly back and forth in the mutilated portion of the ratchet wheel. The reason for this is that after all of the film areas have been advanced across the exposure area and the film has been completely exposed, the mutilated portion 25 of the ratchet wheel is reached so that further winding can continue uninterruptedly until the tail strip of the film, which is the backing paper extending beyond the end of the film, is completely wound on the take-up spool, as will be hereinafter more fully described.

The backlash pawl 26 is pressed toward the ratchet wheel 24 by means of a spring 29 so that a tooth 27 may engage the teeth 23 to prevent counterclockwise movement or rearward movement of the ratchet wheel.

The ratchet wheel 24 may be keyed to a shaft 30, this shaft turning with the ratchet wheel and also carrying a stop disk 31 and a dial disk 32. A knob 33 for turning the shaft 30 manually may also be carried on the outer end of the shaft 30.

The stop disk 31 carries a plurality of notches 34, these notches being adapted to control a film-wind lever 35. This lever, best shown in Figs. 2 and 3, is pivoted at 36 to the camera body and includes three arms; an arm 37 which carries a sharp pawl-like point 38 which is positioned to move to and from a ratchet wheel 39 carried on the film-winding shaft 13. Thus, the film-winding knob 12 turns the ratchet wheel 39 when it is free to turn, as indicated in Fig. 2, and the pawl 38 may prevent the shaft 13 from being turned when it enters a tooth of the ratchet wheel 39, as shown in Fig. 3.

A second arm on the lever 35 is the arm 40 which includes a beveled flange 41, best shown in Fig. 4. This flange is adapted to move when a shutter release button 42 is depressed so that the beveled flange 43 rides on the beveled arm 41, thus camming the lever 40 in a clockwise direction about its pivot 36 to the extent shown in Fig. 5, in which position the release button 42 has been fully depressed and has been partially raised again by a spring "S." The released trigger is returned through a portion of its stroke by spring "S" and into a position in which the release button 42 may be latched before returning to its uppermost position of Fig. 4 by the latching lever 45 also pivoted upon stud 36 and held by a spring 46 toward lever arm 40. This position is shown in Fig. 5. A lug 47 limits the movement of arm 45 towards lever arm 40, and there is a part of arm 45—the flange 48—which may ride on the shaft 49 carrying the shutter release 42 until the notch 50 is reached, at which time arm 48 may snap into the notch, as indicated in Fig. 5, to hold the push button 42 in a depressed and inoperative position. This latching movement does not occur during the downward movement of the notch 50 because at that time lug 47 is still engaged by edge 40' of arm 40 and only after further downward movement is the edge 40' spaced from lug 47. Thus, when the trigger has been depressed, the lever 35 is rocked about its pivot 36, releasing the pawl 38 from the ratchet 39 and allowing the push button 42 to be latched in a partially depressed position. The parts will then assume the position shown in Fig. 2 in which the film may be wound. Lever 35 is held with pawl 38 spaced from ratchet 39 by a spring latch 60, as in Fig. 10, this latch being immediately released when film is wound.

The third arm of lever 35 is an arm 52 which extends outwardly so that there is a finger-piece 53 for manually moving this arm, if it should be desired to disconnect the automatic mechanism.

The arm of lever 35 carrying the pawl 38 carries an upstanding lug 54 which is of a width to drop into one of the notches 34 of the notched stop disk 31. When an exposure has been made and the film knob 12 is free to turn, this lug 54 lies on a smooth section 55 of the periphery of the notched stop disk 31, as indicated in Fig. 12. As the notched stop disk is gradually turned, through the strokes of pawl 21 moving the ratchet wheel 24 one step at a time through engagement with the teeth 23, the stop disk will turn and when the lug 54 reaches the notch 34, it may drop therein under the influence of the spring 56, as indicated in Fig. 11, thus allowing the pawl 38 to drop into the ratchet 39 and stop the film-winding movement. A spring 57 normally holds the pawl 21 toward the ratchet wheel 23.

It should be pointed out here that one of the reasons for providing a short stroke on the pawl 21 operating the ratchet 23 is that by so doing, very little force is required to make the successive strokes of the pawl, and we have found that providing from four to six teeth on the ratchet wheel 24 for each area of film to be moved, the drag on the film moving the pinwheel 17, the eccentric pin 20, and the pawl 21, is entirely unnoticeable. The pawl therefore operates from four to six strokes each time the notched stop dick 31 moves an angular distance sufficient to present the next adjacent notch in position to receive the lug 54 to stop the film-winding movement. We have found we can use a roller 16 without teeth or serrations 17 because so little torque is required with this construction.

When all of the film has been used (here, the camera is constructed for eight exposures), the pawl reaches the mutilated portion 25 of the ratchet wheel and, consequently, does not turn the stop disk beyond this point.

In order to prevent the lug 54 from again entering the notch 34, which it has just left after an actuation of the release button 42, we provide the latch mechanism best shown in Figs. 10 and 11. This latch 60 may turn on its pivot 61 and is normally turned in a clockwise direction by means of the spring 56 which may be hooked over the lever 35, as shown. The end of the latch at 63 is formed inwardly so that it may lie in a notch 34, and in its operative position of Fig. 10 it engages a projection 64 on the arm 35 to prevent this arm from moving further in a counter-clockwise direction and to momentarily hold lug 54 out of a notch 34. However, it will be obvious that when the parts are in a position to operate the shutter release button 42 and when this button has been operated, the lug 54 will lie out of the notch 34 and be latched in this outermost position, as shown in Fig. 10. In this position the pawl 38 lies away from the ratchet 39, as shown in Fig. 2, so that the film can now be turned. When the knob 12 is turned, the pawl 21 and ratchet 23 start to move. This moves the notched stop disk 31, and as this disk moves slowly, the latch 63 is cammed by the disk gradually outwardly until the projection 64 may snap behind the latch, as indicated in Fig. 11. Before the latch reaches its Fig. 11 position, the notched stop disk has turned, as illustrated in Fig. 12, a sufficient amount so that the lug 54 may ride on the smooth periphery 55 of the disk, so that by the time the latch 63 releases the projection 64, the lever 35 can no longer turn in a counter-clockwise direction because of the periphery 55. Thus, winding may freely continue until the Fig. 11 position is reached and the lug 54 drops into notch 34, thereby automatically stopping the film-winding movement through pawl 38 and ratchet wheel 39. Simultaneously with the movement of the lug 54 in the notch 34, the arm 48 is removed from the notch 50 of the push button 42, because lug 47 strikes edge 40' of arm 40 of lever 35 and moves this arm from the notch.

The disk 32 is merely an indicating disk having thereon graduations 70 for indicating the number of exposures when a graduation is brought opposite the pointer 71. When a user is ready to take a roll of film, a fresh roll is loaded into the supply chamber 9, the backing paper is drawn across the exposure frame 10, and the take-up film spool is placed in the take-up chamber 11 with the slot in the flange 15 engaging the driving flange 14. The operator then holds the arm 53 of lever 35 in the position shown in Fig. 2, so that he may freely turn the knob 12 until the numeral I appears in the usual red window in the camera back, not shown but customarily used in roll-film cameras. The knob 33 is then turned until the numeral I is opposite the arrow 71 and the lever 53 is released. The camera is now ready for the first exposure. Depressing the push button 42 cams the lever 35 to its Fig. 2 position in which it is latched by latch 60, so that the arm 48 is spring-pressed against the shaft 49 and will drop into the notch 50 as push button 42 raises part-way after being fully depressed, as shown in Fig. 5. If the operator does not wind film, he cannot again depress the trigger 42 a sufficient distance to operate the shutter because it is already latched in a partially depressed position. The next operation will therefore be to turn the film-winding knob 12. This can be done because the parts are in the Fig. 2 position and the knob is turned to wind film. During the movement of the film "F" over the pinwheel 17, the shaft 18 is rotated a plurality of revolutions, each revolution causing the pawl 21 to make a short stroke, moving the ratchet wheel 23 the distance of one tooth. For a complete film area, we prefer to move the pawl five or six times so that the force necessary to accomplish this movement is extremely slight and an undue load is not imposed on the film. When the proper amount of film is wound, the lug 54 will drop into a notch 34 and, at the same time, the pawl 38 will engage the ratchet 39, halting the winding movement. The dial 32 will be advanced to indicate the number of exposures made. In addition, when the film-wind mechanism is latched, the shutter release knob 42 is unlatched through the engagement of lug 47 with arm 40 of the lever, as indicated in Fig. 2. Thus, the knob 42 may move upwardly into its operative position, and the film will be latched against movement.

The above film-metering device is comparatively simple and can be very easily operated without any undue strain on the film. If the double-exposure prevention mechanism is added, the trigger may be latched until the film is wound and the film winding mechanism is automatically latched after a fresh exposure has been wound across the exposure aperture and until the next exposure is made.

We claim:

1. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever.

2. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchel wheel from moving in one direction, the ratchet wheel including an area in which there are no teeth, whereby said driving pawl may move idly without actuating the ratchet wheel when the ratchet wheel is moved to present the toothless area to the driving pawl, a notched stop disc connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever comprising a shutter release lever movably mounted on the camera body and including a cam engaging the stop lever and moving the stop lever from a notch in the stop disk.

3. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever comprising a shutter release lever movably mounted on the camera body and including a cam engaging the stop lever and moving the stop lever from a notch in the stop disk, a spring tending to engage the stop lever and stop disk, and a spring latch engaging the stop disk and the notches therein for engaging and holding the stop lever from the stop disk when resting in a notch in the stop disk.

4. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera, a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever comprising a shutter release lever movably mounted on the camera body and including a cam engaging the stop lever and moving the stop lever from a notch in the stop disk, a spring tending to engage the stop lever and stop disk, and a spring latch engaging the stop disk and the notches therein for engaging and holding the stop lever from the stop disk when resting in a notch in the stop disk, the stop disk having a smooth periphery between the notches whereby the spring latch may be moved from a notch-engaging position to a position to engage the smooth periphery between notches as the stop disk turns, thereby moving the spring latch from a holding position in contact with the stop lever and allowing the spring to move the stop lever into contact with the stop disk.

5. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera, a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever, said notched stop disk comprising a circular plate having a smooth periphery interrupted with notches extending inwardly, a lug on the stop lever for resting on the smooth periphery, the width of the notches being greater than the width of the lug to receive the lug as the stop lever moves to an engaging position relative to the ratchet wheel on the film wind.

6. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera, a ratchet wheel mounted on the shaft to turn therewith, said ratchet being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever, said means comprising a slotted trigger having a cam thereon, a trigger lever pivoted to the stop lever, a spring tending to move the trigger lever toward the stop lever and toward the slotted trigger to engage said slot when the trigger is moved to a predetermined position to hold the trigger against further movement.

7. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera, a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever, said means comprising a slotted trigger having a cam thereon, a trigger lever pivoted to the stop lever, a spring tending to move the trigger lever toward the stop lever and toward the slotted trigger to engage said slot when the trigger is moved to a predetermined position to hold the trigger against further movement, a lug on the trigger lever positioned to engage the stop lever and limit movement of the trigger lever toward the stop lever, whereby said trigger lever may be held away from the slotted trigger by the stop lever until the latter is moved to release the ratchet wheel on the film wind, at which time the trigger lever may be moved by its spring into engagement with the trigger to limit movement thereof.

8. The roll-holding camera of the type defined in claim 1 characterized in that the number of teeth on the ratchet wheel moved by the film-driven pawl are an even multiple of the number of notches in the notched stop disk whereby the number of strokes imparted by the film to the pawl in moving one exposure area may drive the notched stop disk one notch, and whereby the stop lever may, by engaging a notch in the stop disk, drop into the notch and the ratchet wheel on the means for winding film to halt the winding movement thereof.

9. In a roll-holding camera of the type including a camera body, an exposure frame, film spool chambers and means for winding film from one spool to another across the exposure frame for exposure, the combination with said film wind, of a film-measuring roller at one end of the exposure frame over which a film passes, said roller being turned by the film, a driving pawl eccentrically carried by the roller, a rotatable shaft carried by the camera, a ratchet wheel mounted on the shaft to turn therewith, said ratchet wheel being engaged by the driving pawl for moving the ratchet wheel by the pawl when film is moved, a dial carried by the shaft and movable with the ratchet wheel and bearing exposure numbers, the teeth of the ratchet wheel, stroke of the pawl, and diameter of the film roller being selected to advance the dial one number for each fresh exposure area of film wound over the roller, a second holding pawl for preventing the ratchet wheel from moving in one direction, the ratchet wheel including an area in which there are no teeth, whereby said driving pawl may move idly without actuating the ratchet wheel when the ratchet wheel is moved to present the toothless area to the driving pawl, a notched stop disk connected to and movable with the ratchet wheel, a ratchet wheel on the film wind, a stop lever pivotally mounted on the camera and engaging the stop disk and when engaging a notch thereof to also engage the ratchet wheel on the film wind to stop movement thereof, and means for releasing the stop lever, said means comprising a slotted trigger having a cam thereon, a trigger lever pivoted to the stop lever, a spring tending to move the trigger lever toward the stop lever and toward the slotted trigger to engage said slot when the trigger is moved to a predetermined position to hold the trigger against further movement, the stop lever and the trigger lying on opposite sides of the trigger, the cam on the stop lever extending in the direction of movement of the trigger to be engaged and moved thereby, the trigger lever being movable transversely of the movement of the trigger to engage and the slot in the trigger and a spring connecting the stop lever and trigger lever tending to move them together and the trigger lever into contact with the trigger.

DOUGLASS C. HARVEY.
EDGAR S. MARVIN.

REFERENCES CITED

The following references are of record in the file of this patent:

UNITED STATES PATENTS

| Number | Name | Date |
|---|---|---|
| 464,904 | Talley | Dec. 8, 1891 |
| 492,734 | Meredith, Jr. | Feb. 28, 1893 |
| 1,215,614 | Brown | Feb. 13, 1917 |
| 1,913,184 | Zubaty | June 6, 1936 |
| 2,090,017 | Young | Aug. 17, 1937 |
| 2,148,636 | Muller et al. | Feb. 28, 1939 |
| 2,218,241 | Hughey | Oct. 15, 1940 |
| 2,345,999 | Babcock | Apr. 4, 1944 |
| 2,398,412 | Crumrine | Apr. 6, 1946 |

FOREIGN PATENTS

| Number | Country | Date |
|---|---|---|
| 603,077 | Germany | Sept. 21, 1934 |
| 672,537 | Germany | Mar. 4, 1939 |